No. 678,041. Patented July 9, 1901.
G. L. SANDERSON.
STADIA ROD.
(Application filed Mar. 25, 1901.)
(No Model.)
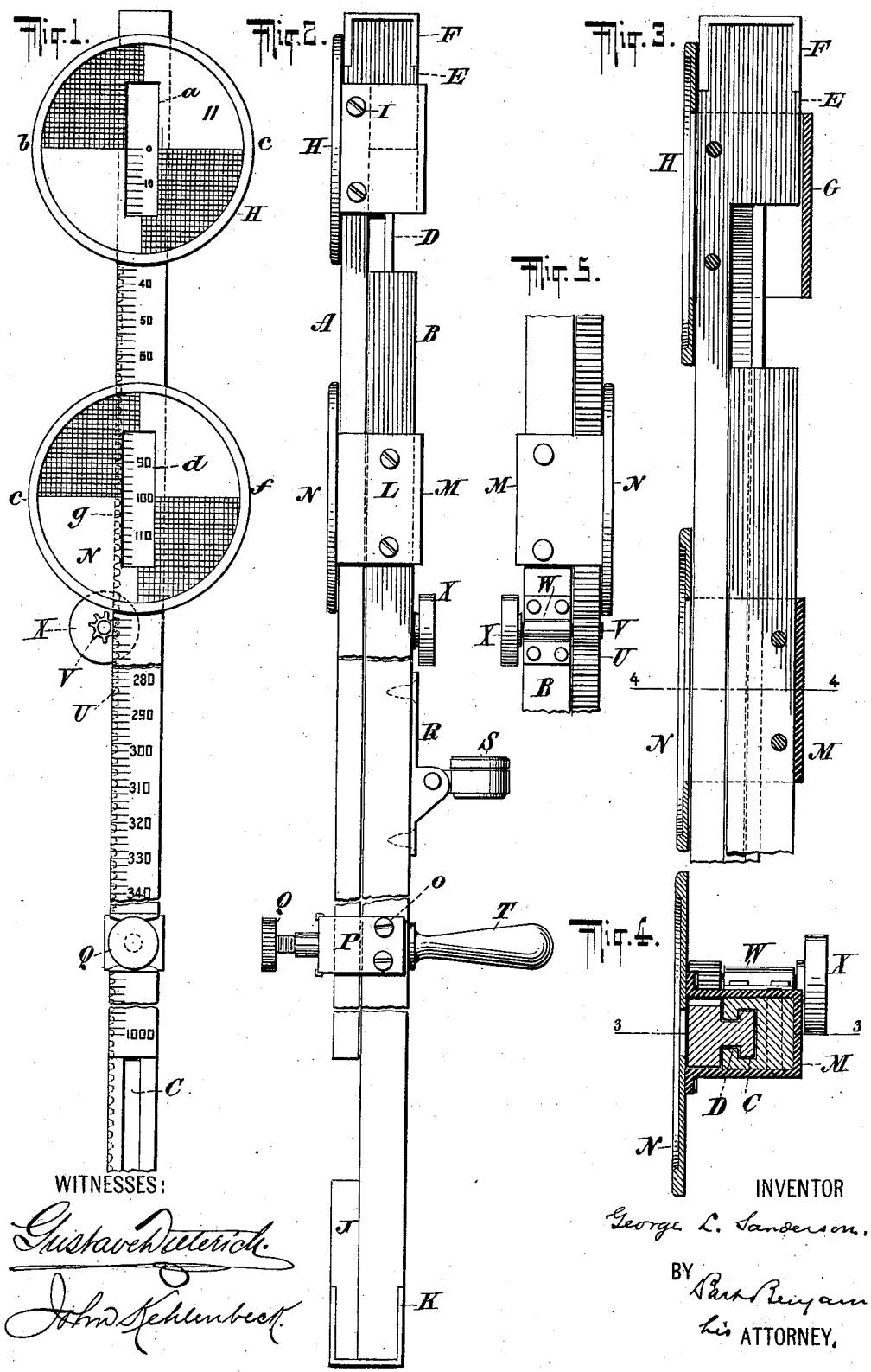
WITNESSES:
INVENTOR
George L. Sanderson,
BY
his ATTORNEY.

UNITED STATES PATENT OFFICE.

GEORGE L. SANDERSON, OF ANTESFORT, PENNSYLVANIA.

STADIA-ROD.

SPECIFICATION forming part of Letters Patent No. 678,041, dated July 9, 1901.

Application filed March 25, 1901. Serial No. 52,683. (No model.)

*To all whom it may concern:*

Be it known that I, GEORGE L. SANDERSON, of Antesfort, Pennsylvania, have invented a new and useful Improvement in Stadia-Rods, of which the following is a specification.

My invention relates to a stadia-rod, such as used in surveying and for the making of stadia measurements.

The object of the invention is to improve the construction and render more easy the manipulation and reading of the rod in use.

The invention consists in a stadia-rod constructed as hereinafter described, and more particularly pointed out in the claims.

A stadia-rod is commonly used in connection with a sight having a compound cross-wire ring or diaphragm provided with three horizontal wires. The rod itself is commonly marked off with spaces, which should be equal to that which the instrument intercepts at one hundred feet. The rod is also commonly provided with two movable targets, such as are used on leveling-rods and with an attached plumb or level. There is also a point marked upon the rod at the ordinary height of the horizontal axis of the sighting instrument. In using the sight the middle horizontal cross-wire is brought upon the "height of instrument" marked on the rod, and the targets are then moved successively thereon until they coincide with the outer wires, the rod of course being kept vertical. If the telescope has been level during this operation, the distance given by the rod plus the instrument-constant can be recorded. If the line of sight has been elevated or depressed, then the distance given by the rod with certain corrections is taken. Stadia measurements thus made are as reliable as chain measurements upon fairly-level ground and are much more accurate than chain measurements on broken country.

It has been found in practice almost impossible for the most expert rodman successively to move the targets on the rod, as above described, and at the same time to keep the rod in proper position. It requires many movements to bring the two targets into correct line and much waste of time. Furthermore, the engineer at the telescope finds difficulty at a distance of five hundred or a thousand feet in directing the successive movements of the targets by the rodman. One target may be correct while the other is wrong, so that the reading of the rod is rendered incorrect. For this reason stadia-rods have been made without targets and the engineer left to read the spaces on the rod which the instrument intercepts at a distance through the transit-telescope, which is very difficult to do correctly.

My invention overcomes the difficulties of the stadia-rod before mentioned.

Referring to the accompanying drawings, Figure 1 is a front elevation. Fig. 2 is a side elevation. Fig. 3 is a vertical section on the line 3 3, Fig. 4. Fig. 4 is a transverse section on the line 4 4 of Fig. 3. Fig. 5 is a detail view of a device for raising and lowering the movable rod by means of a rack and pinion.

A and B represent two rods of wood or metal, the rod A being placed in proximity to and adapted to slide on the rod B. In the face of the rod B is made a dovetail groove C, and on the opposite side of the face of the rod A is a tenon D, adapted to enter said groove, so that said rods are at all times held in juxtaposition. On the upper part of the rod A is a shoulder E, which may be provided with a metal cap F. Surrounding the inner portion of this shoulder and the rod A is a metal strap G which carries on the front side of rod A the upper target H. The strap G is rigidly secured to the rod A by the screws I. When the rod A is slid down upon the rod B, the upper end of rod B enters the strap G and has a bearing against the shoulder E of rod A. So, also, the lower end of rod A bears against the shoulder J on the lower portion of the rod B, and on the extremity of rod B there is also provided a metal cap or guard K. When the two rods are thus closed together, the ends of one bearing on the shoulder of the other, they may measure about six feet in length and about one by one and a half inches in cross-sectional dimension.

Secured to the rod B by the screws L is a strap M, which carries the lower target N. Also secured to the rod B by the screws O is a strap P, through which passes the set-screw Q, by means of which the two rods are clamped together after the rod A is slid up or down as much as may be desired. On the rear side of the rod B there is secured in a suitable bracket R a spirit-level S, and below the spirit-level S is also secured to the rod B a handle T. On the side of rod A may be formed or secured a toothed rack U. With this rack engages the pinion V, which is supported in a bearing W, attached to rod B. Said pinion is turned by the hand of the operator by means of the milled head X.

The front side of rod A is graduated to hundredths of feet, commencing by about two inches from the top at the zero-mark, Fig. 2, and each graduation is preferably in multiples of two, as shown.

The upper target H, which is permanently secured to the rod A, has a slot $a$, through which graduations on the front of the rod can be seen, and its horizontal lines $b$ and $c$ coincide with the zero-mark of the graduations. The lower target N also has a slot $d$, through which the graduations on the front of the rod A can be seen. This target is to be secured immovably, as stated, upon the rod B at a distance from the lower end thereof corresponding to the height above the ground of the transit instrument used.

The mode of operation of this rod is as follows: The rodman faces the transit instrument, holding the apparatus vertically. With one hand he grasps the rod B or handle T thereof, if it be present, so as to hold that rod vertically and immovably. With the other hand he raises or lowers the rod A by turning the milled head X, or if no lowering device such as shown in Fig. 5 is present he simply grasps the rod A with his hand. In this way the rod A is moved in a vertical direction until the horizontal lines $b$ $c$ of target H and $e$ $f$ of target N are brought into coincidence with the proper wires of the sight. The rods A and B are then clamped by means of the clamp Q, and the horizontal lines $e$ $f$ of the lower target then point to the graduations marked on the front of the rod A, which is the correct rod-reading required. Fractional parts of the graduation may be read by the vernier $g$, which is disposed on one side of the slot $d$ on the lower target.

From the foregoing description it will be seen that neither of the targets is movable upon the rod which supports it and that to move one target with reference to the other all that is required is a simple movement in one direction, after which the rod can be directly read in figures. Furthermore, as the lower target N is immovably fixed at the height of instrument-mark it is always in correct position.

The graduation-scale on the front of rod A is preferably made of a metal plate secured on said rod instead of on the wood of the rod itself. Especial attention is called to the fact that not only graduations, but numbers in proximity thereto, are employed, so that the reading of the rod may be instantly obtained.

I do not limit myself to the use of a rack and pinion, as shown in Fig. 5, for raising and lowering the rod A, inasmuch as any other suitable device for that purpose may be substituted, or it may be omitted altogether, the operator merely moving the rod by hand.

I claim—

1. In a stadia-rod having two adjustable portions, one of said portions having a graduated outer face, two targets both facing in the same direction disposed in front of said face and supported respectively by said rods, substantially as described.

2. In a stadia-rod, a fixed portion and a movable portion adapted to slide on said fixed portion, the said movable portion being provided with a graduated scale on its outer face, a target secured on said movable portion, and a target secured on said fixed portion, said last-named target being disposed in front of said graduated scale, and provided with an opening exposing said scale, substantially as described.

3. The combination in a stadia-rod of two rods constructed to slide one upon the other longitudinally, one of said rods being provided with graduations on its outer face, means for holding said rods in juxtaposition, a target supported on said graduated face, a second target disposed on said graduated face and having an opening exposing said face, and means for supporting said second target on said non-graduated rod, substantially as described.

4. The combination in a stadia-rod of the rods A, B constructed to slide one upon the other longitudinally, said rod A being provided with graduations and numerals on its outer face, means for holding said rod in juxtaposition, a target H supported upon the graduated face of rod A and a target N supported upon said rod B and in front of the graduated face of rod A, and having an opening exposing said face, substantially as described.

5. The combination in a stadia-rod of the rods A, B provided respectively with the groove C and tenon D, a graduated scale on the outer surface of rod A, target H supported on said rod A, strap M on rod B and target N carried by said strap; said target N being disposed in front of said scale and having an opening through which said scale is exposed.

6. The combination in a stadia-rod of the rods A, B, said rod A having a graduated scale on its outer face, means for holding said rods in juxtaposition, means for causing rod A to slide on rod B, a target H supported on rod A and a target N supported on rod B; said target N being disposed in front of said scale and provided with an opening through which said scale is exposed, substantially as described.

GEORGE L. SANDERSON.

Witnesses:
FRANCIS T. WILSON,
WM. R. PEOPLES.